May 21, 1968  R. F. RUTH  3,383,794

PROGRAMMABLE CONTROL DEVICES

Filed Dec. 28, 1965  4 Sheets-Sheet 1

INVENTOR
ROGER F. RUTH

BY Arnold and Roylance
ATTORNEYS

May 21, 1968 R. F. RUTH 3,383,794
PROGRAMMABLE CONTROL DEVICES
Filed Dec. 28, 1965 4 Sheets-Sheet 4

INVENTOR
ROGER F. RUTH

BY Arnold and Roylance
ATTORNEYS

United States Patent Office 3,383,794
Patented May 21, 1968

3,383,794
PROGRAMMABLE CONTROL DEVICES
Roger F. Ruth, 11 Jade Drive, Victoria, Tex. 77901
Filed Dec. 28, 1965, Ser. No. 517,042
11 Claims. (Cl. 46—244)

This invention relates to programmable electrical control devices and to electrically operated toys and the like embodying such control devices.

There has long been a requirement in many arts for a simple and inexpensive device capable of accomplishing programmed control of the time, sequence and direction of current flow in a plurality of electrical circuits. As a typical example, there can be considered an electrically operated toy vehicle having reversible electric motors each associated with a different one of the wheels of the vehicle, an electrically operated horn, and a signal light, the wheel motors, horn and light each being connected by an appropriate circuit to a battery or batteries carried by the vehicle. By equipping the toy with a programmable control device, it is possible to have the toy operate automatically through a predetermined sequence of maneuvers, with appropriate periodic operation of the horn and light. Programmable control devices have been proposed in the past for such purposes but have proved too costly to manufacture and in some cases have had the further disadvantage of failing to offer an analogy to the programming sciences as practiced in connection with full scale apparatus.

Some prior art devices have employed punched tapes as the programmable element, but in such cases the requirement for replacement tapes, which either had to be purchased in pre-punched form or punched by the user with elaborate equipment, has rendered the devices unsuitable for such things as toys. Other devices have employed cam operated switches, with programming being accomplished by replacement of the cams, but such switches have proved too expensive and fail to provide the desired analogy to full scale programming operations.

Another object is to devise a programmable electrical control device which is sufficiently simple and inexpensive to be practical for incorporation in toys and the like.

Another object is to devise a programmable electrical control device which can be made small in size, yet will operate in a fashion truly analogous to industrial programming systems.

A further object is to provide, in devices of the type described, an improved and simplified form of program board.

Yet another object is to provide a programmable electrically operated toy which, though relatively inexpensive, offers a wide range of programmable operations.

Stated in general terms, programmable control devices in accordance with the invention comprise a program board; a plurality of electrically conductive means each defining a predetermined path over the program board with the several conductive paths being insulated from each other, the board having a plurality of apertures arranged in groups with the apertures of each group spaced along a different one of the conductive paths; means for connecting a source of electrical power to the conductive paths and comprising a plurality of connector units each including a pin insertable in one of the apertures; a plurality of contacts to be connected to the electrical means to be controlled, the contacts being supported in such predetermined positions relative to the program board that selected ones of the contacts engage the various conductive paths; and drive means for accomplishing relative movement between the board and the contacts to cause the contacts to traverse the respective conductive paths. The conductive means forming the paths to be followed by the contacts and the connector units coact, when the pins are properly inserted in the apertures in the board, to connect the source of power to portions of the conductive paths which are predetermined by the choice of apertures. The invention embraces a number of forms of conductive paths, and a number of forms of pins, of such nature as to be easily and inexpensively manufactured and to be useful in devices of such small size as to render the devices suitable for incorporation in toy vehicles and the like.

In order that the manner in which the foregoing and other objects are achieved in accordance with the invention can be readily understood, several particularly advantageous embodiments of the invention will be described in detail with reference to the accompanying drawings, which form a part of this specification, and wherein.

Figure 1:
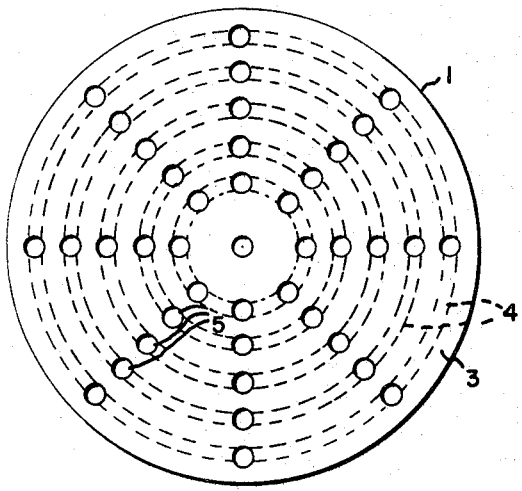
FIG. 1 is a plan view of a program board in accordance with one embodiment of the invention.
Figure 2:
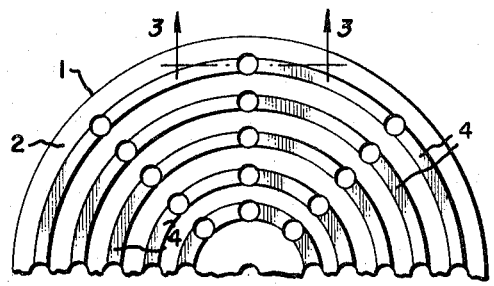
FIG. 2 is a fragmentary plan view of the program board of FIG. 1 but from the opposite side.
Figure 3:
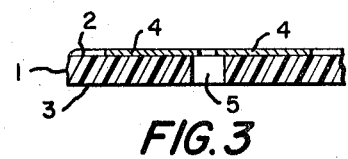
FIG. 3 is a fragmentary sectional view taken on line 3—3, FIG. 2.

Turning now to the drawings in detail, FIGS. 1–3 illustrate one form of programming board in accordance with the invention. Here, the board comprises a circular disc 1 of suitable rigid electrical insulating material, the disc being flat and presenting opposed major surfaces 2 and 3. Suitably secured to surface 2 in any conventional fashion are a plurality of arcuate metal strips 4. The strips 4 are thin and flat and arranged end-to-end in five concentric circularly extending series. Both ends of each segment 4 are arcuate and the segments of each circular series are spaced apart in such fashion that the adjacent arcuate ends of each adjacent pair of segments lie on the same circle. The board 1 is provided with a plurality of cylindrical apertures 5, the axes of all of the apertures 5 extending at right angles to the major surfaces 2 and 3 of the board. Each aperture 5 is located between the adjacent ends of a different adjacent pair of the arcuate segments 4. The apertures 5 are identical and of a diameter such that the cylindrical wall of the aperture is coincident with the circle defined by the two arcuate ends of the corresponding pair of segments 4, as will be clear from FIG. 3.

The five series of segments 4 define five concentric circular conductive paths, with each path being interrupted by eight of apertures 5.

Figure 4:
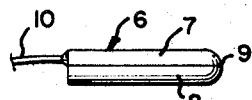
FIGS. 4 and 5 are side elevational views of two forms of pins useful with the program board of FIG. 1.

In this embodiment, the control device employs a plurality of pins insertable selectively in the apertures 5 to connect a source of electrical power to portions of the four concentric paths defined by the arcuate conductive segments, and to interconnect the segments. In FIG. 4, the pin 6 is cylindrical and has a diameter such as to fit snugly within one of the apertures 5. Pin 6 consists of two portions 7 and 8 each constituting one-half of the pin, considering the pin to be divided longitudinally. Portion 7 is of a suitable metal, so as to be electrically conductive. Portion 8 is of a suitable electrical insulating material. The leading end 9 of the pin is rounded, for ease of insertion of the pin into the apertures 5. An electrical conductor 10 is soldered or otherwise suitably connected to the trailing end of conductive portion 7.

Figure 5:
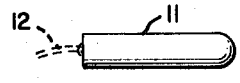

The pin 11, FIG. 5, has the same size and configuration as pin 6, but is formed as a single piece from metal so that the entire pin 11 is conductive. A conductor 12 can be soldered or otherwise connected to the trailing end of the pin 11, or the pin can be used without the conductor.

Figure 6:
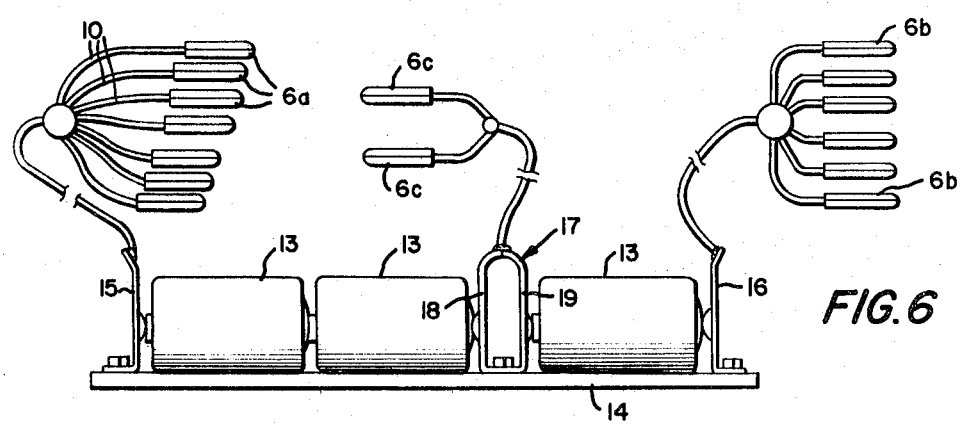
FIG. 6 is a side elevational view of a battery holder and conductors connected between the terminals of the battery holder and various programming pins in accordance with FIGS. 4 and 5.

Conductors 10 and 12 serve to connect the pins 6, or a combination of pins 6 and 11, to a suitable electrical power source, in this case provided by a plurality of batteries 13, FIG. 6. Batteries 13 are removably retained by a battery holder comprising a base 14 to which are secured two resilient metal members 15 and 16 effective both as terminal members and as means for applying an axial clamping force to the batteries 13. In this embodiment, the battery holder accommodates three batteries 13 positioned end-to-end along base 14, with an additional terminal structure, indicated generally at 17, FIG. 6, interposed between two of the batteries. Terminal structure 17 is formed from a single strip of resilient metal bent into U-shape, with the base of the U secured by a fastener to base 14 and with the two legs 18 and 19 of the U projecting away from base 14. The ends of legs 18 and 19 are bent toward each other and secured together, as by a solder joint.

In this embodiment, only pins of the type shown in FIG. 4 are used to connect the power source to the program board. Thus, seven pins 6a are connected via the respective conductors 10 to terminal 15; six pins 6b are connected to terminal 16, and two pins 6c are connected to terminal structure 17, providing an arrangement in which two of the batteries 13 can be employed in series, or all three batteries can be connected in series.

Figure 7:
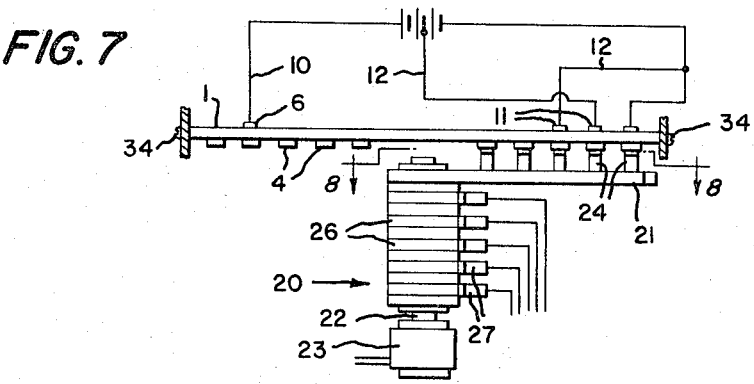
FIG. 7 is a side elevational view of an assembly of contacts, driving means, and slip rings useful in conjunction with the program board of FIG. 1.
Figure 8:
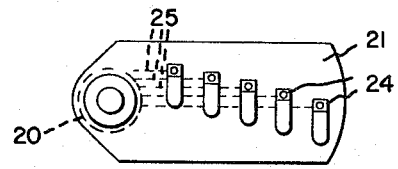
FIG. 8 is an elevational view taken as indicated by line 8—8, FIG. 7.

The program board illustrated in FIGS. 1–3 and supplied with current by the assembly shown in FIG. 6 is employed in conjunction with mechanism providing a plurality of contacts arranged to traverse different ones of the conductive paths defined by segments 4. One suitable contact arrangement is illustrated in FIGS. 7 and 8 and comprises a slip ring drum, indicated generally at 20, and a contact carrying arm 21, both mounted on the shaft 22 of an electrical motor 23. The combination of motor 23, drum 20 and arm 21 is supported in such fashion that the axis of shaft 22 is at right angles to board 1 and extends through the common center of the several conductive paths defined by segments 4. Arm 21 is thus parallel to board 1 and, when motor 23 is operated, rotates in a plane parallel to the board. On its face which is directed toward board 1, arm 21 supports five resilient contacts 24 each having one end rigidly secured to the arm and the other end resiliently urged against board 1 in such a position that the contact will traverse one of the conductive paths defined by segments 4 when the arm is rotated. Arm 21 is provided with five conductors 25, indicated in dotted lines in FIG. 8, each arranged to connect a different one of the contacts 24 to one of the slip rings 26 on drum 20. Conductors 25 can be provided in any conventional fashion and may, for example, take the form of thin metal strips or printed circuit elements carried by the surface of arm 21 which is opposite contacts 24. As indicated in FIG. 8, drum 20 can be hollow, so that extensions of conductors 25 can be provided within the drum and connected to the slip rings 26 via suitable transversely extending bores. Both arm 21 and the body of drum 20 are made of electrical insulating material, so that each combination of one of the contacts 24, one of the conductors 25, and one of the slip rings 26 is electrically isolated. A plurality of sliding contacts 27 are mounted immediately adjacent to drum 20 and are each disposed for sliding contact with a different one of the slip rings 26. Contacts 27 are connected by suitable conductors, as later described, to the various electrical devices to be controlled.

Figure 9:
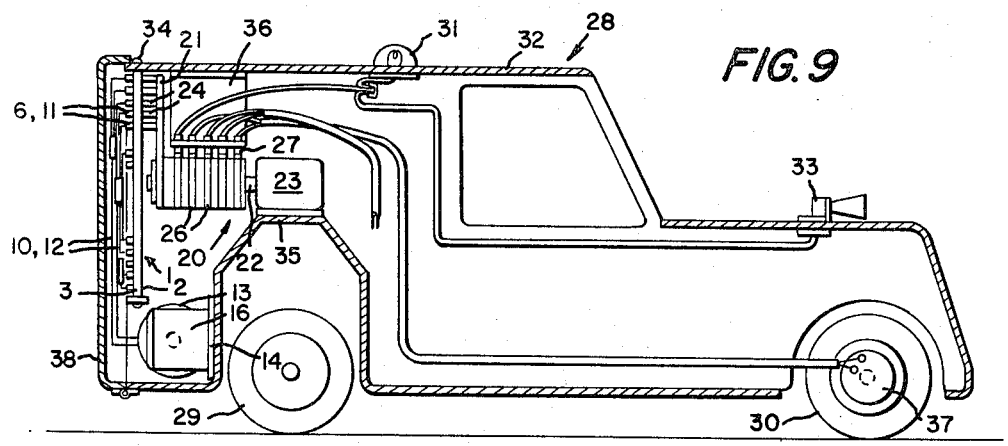
FIG. 9 is a longitudinal sectional view, with some parts shown in elevation, of a toy vehicle in accordance with the invention.
Figure 10:
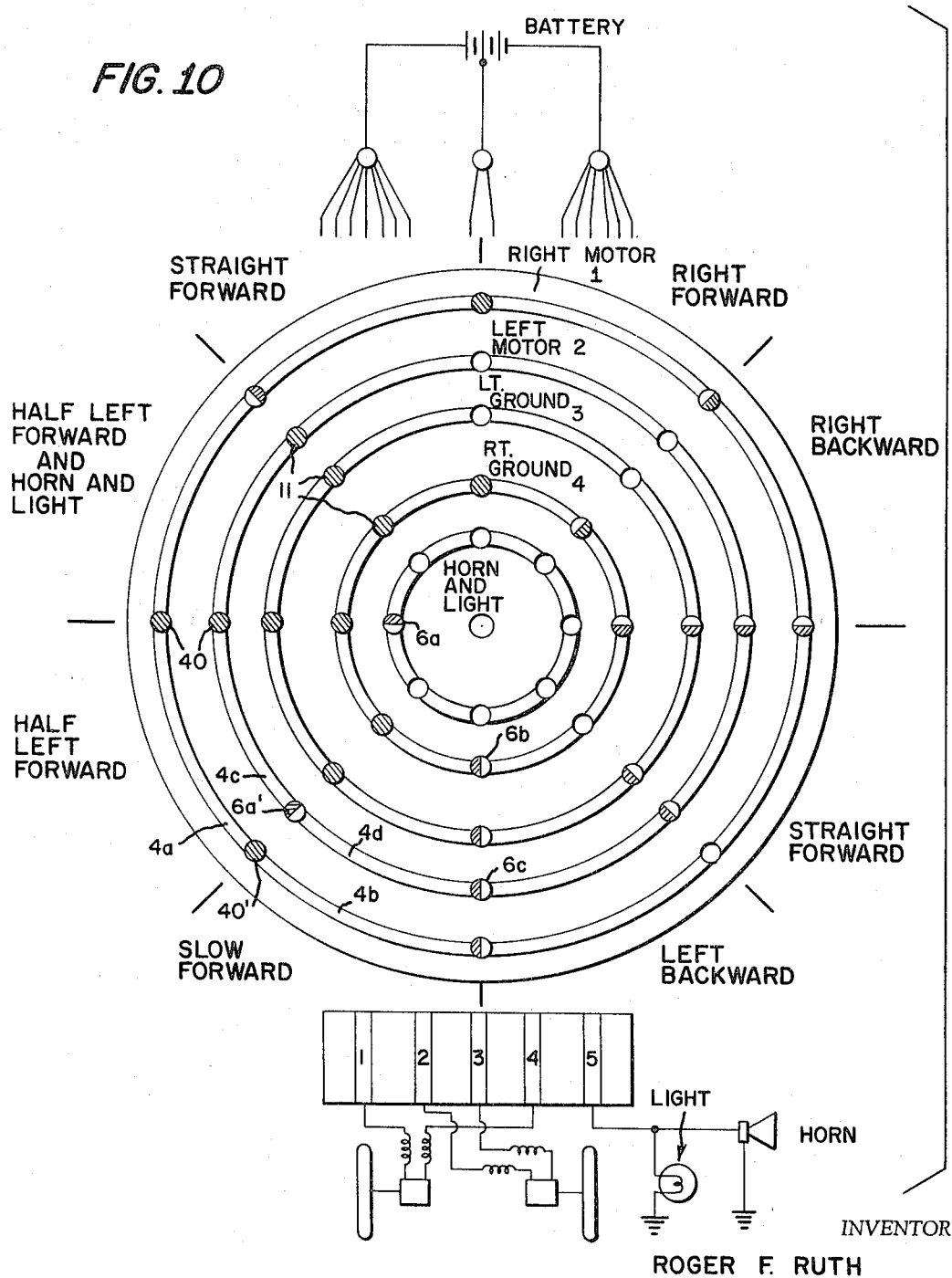
FIG. 10 is a schematic diagram illustrating the programmable control device embodied in the vehicle of FIG. 9.

FIGS. 9 and 10 illustrate the manner in which the programmable control device described with reference to FIGS. 1–8 can be embodied in a toy vehicle. In FIG. 9, the vehicle is indicated generally at 28 and comprises a suitable body structure supported by freely rotatable rear wheels, one of which is indicated at 29, and independently driven front wheels, one of which is indicated at 30. A signal lamp 31 is mounted on the roof 32 of the vehicle, and any suitable audible signal 33 is mounted on the hood of the vehicle.

The program board 1 is mounted within the vehicle, being rigidly secured thereto, as by screws 34. The board extends transversely of the vehicle, with surface 2 directed forwardly and surface 3 rearwardly.

The driving motor 23 for the rotary contact structure is secured to a suitable support 35 in such fashion that shaft 22 projects rearwardly toward board 1 and at right angles thereto. The movable contacts 24 carried by arm 21 are operatively engaged with the conductive paths presented by board 1, as hereinbefore described. Contacts 27 are supported by a bracket 36 which depends from the roof of the vehicle, the bracket being of suitable rigid insulating material. Insulated conductors connect the appropriate ones of contacts 27 to the two driving motors for the front wheels, one driving motor being seen at 37, and to the signal lamp 31 and the audible signal 33.

The battery holder, with its three batteries 13, is mounted within the vehicle in a position below the board 1 and drum 20. The length of conductors 10, 12 is such that the appropriate pins 6a, 6b and 6c can readily and easily be plugged into the selected apertures 5 in board 1. So that the operator of the toy can have ready access to the programmable control device, the rear of the vehicle is closed by a pivoted door structure 38.

Before describing the operation of the toy, it is to be recognized that the front wheels 30 are not steerable, steering of the vehicle being accomplished by selective energization of the two wheels motors 37.

FIG. 10 indicates schematically the programmable control device as applied to the vehicle 28 in FIG. 9. In FIG. 10, it will be noted that the outermost one of the circular conductive paths defined by one group of segments 4 is employed to control the drive motor for the right-hand front wheel of the vehicle. Similarly, the next conductive path is employed to program operation of the drive motor for the left front wheel. The next two conductive paths provide the necessary ground connections for the left and right wheel motors, respectively. Finally, the innermost one of the conductive paths is employed to program energization of the signal lamp 31 and the audible signal 33.

The particular program illustrated in FIG. 10 employs all of the pins 6a, 6b and 6c illustrated in FIG. 6. In addition, twelve of the pins 11, FIG. 5, are employed (without conductors 12) to establish electrical continuity between the adjacent arcuate segments 4. Considering FIG. 10 in view of FIGS. 3–5, it will be understood that whenever one of the pins 6a–6c is properly inserted in one of the apertures 5, the pin can be adjusted in such fashion that the conductive half 7 thereof engages only one of the adjacent segments 4, the other of the adjacent segments being engaged by the non-conductive half 8 of the pin. On the other hand, when one of the pins 11 is employed, the pin will come into electrical contact with both of the segments 4 adjacent to the aperture 5 into which the pin is inserted. Thus, pin 11', FIG. 10, serves to electrically interconnect segments 4a and 4b. Pin 62', however, being constructed in accordance with FIG. 4, and properly adjusted in the corresponding aperture 5, serves to provide a connection between the corresponding conductor 10 and segment 4c, but provides no connection between that conductor and segment 4d. Recognizing that the vehicle will turn to the left or right in accordance with the manner and direction in which the motors 37 are energized, the program illustrated in FIG. 10 will provide the sequence of operations explained by the legends in the figure.

Figure 11:
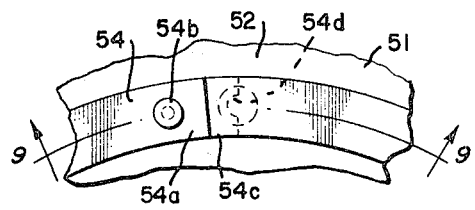
FIG. 11 is a fragmentary plan view of a modified form of program board.
Figure 12:
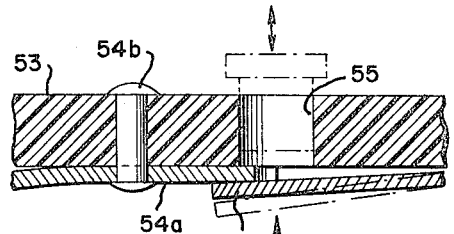
FIG. 12 is a sectional view taken on line 12—12, FIG. 11.

FIGS. 11 and 12 illustrate a program board 51 which, while similar to that described with reference to FIGS. 1-3, represents another embodiment of the invention. Here, each of the circular conductive paths is defined by a plurality of normally flat, resilient metal strips 54 which extend arcuately over the major face 52 of the board. One end portion 54a of each strip is rigidly secured to the board, as by a rivet 54b. The other end portion 54c of each strip overlaps the fixed end portion 54a of the next successive strip and is accordingly deflected away from surface 52 because of the presence of end portion 54a, as will be clear from FIG. 12. Accordingly, all of the segments 54 in the circular group of segments are electrically interconnected, because of the overlapping engagement between the adjacent segments.

Figure 13:
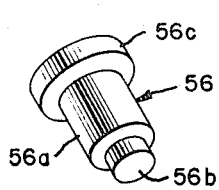
FIG. 13 is a perspective view of a pin useful with the board of FIGS. 11 and 12.

The board 51 is provided with a plurality of apertures 55 which are cylindrical and extend through the board at right angles to surfaces 52, 53. The tip of end portion 54a of each segment 54 is provided with a semi-circular notch 54d which is of significantly smaller diameter than are the apertures 55. Each aperture 55 is located adjacent the tip of end portion 54a of a different one of the segments 54, the position of the aperture being such that the central axes of the aperture and of the corresponding notch 54d are coincident. Accordingly, each end portion 54a overhangs the corresponding aperture 55. To program the board, a plurality of pins 56, FIG. 13, are provided. Each pin 56 includes a plan cylindrical main body portion 56a, a tip portion 56b projecting from one end of the body portion, and a cylindrical head portion 56c at the other end of the body portion. The length of body portion 56a is equal to the length of the aperture 55, so that, when one of the pins 56 is fully inserted in one of the apertures 55, the head portions 56c of the pin will engage surface 53 of the program board, while the shoulder between the body portion 56a and the tip portion 56b will engage one side of the end portion 54a of the corresponding segment 54. The diameter of tip portion 56b is equal to the diameter of the arcuate notch 54d in end portion 54a of the segment so that the extension 56b is snugly embraced by the notch 54d. The length of tip portion 56b is such that, when the pin 56 is fully inserted in one of the apertures 55 so that the head portion 56c comes into engagement with surface 53 of the program board, the tip 56b will engage the corresponding free end portion 54c and deflect the same away from the program board so that the free end portion 54c is physically separated from and out of electrical contact with the adjacent segment end portion 54a.

When the pin 56 is of non-conductive material, insertion of the pin into one of the apertures serves simply to prevent current flow between the corresponding pair of segments 54. When the pin 56 is made entirely of conductive material, full insertion of the pin allows the pin to act as a conductive connection for supplying current to the annular path defined by the corresponding group of segments 54. Finally, the body portion 56 of the pin can be of metal, and the tip portion 56b of insulating material, in which case full insertion of the pin into one of the apertures 55 will allow the body of the pin to be used as a connector for establishing current flow to the one of the segments 54 which is disposed with its end portion 54a at the aperture into which the pin has been inserted, the other segment of the pair of segments being electrically isolated because of the non-conductive nature of the tip portion 56b of the pin.

Figure 14:
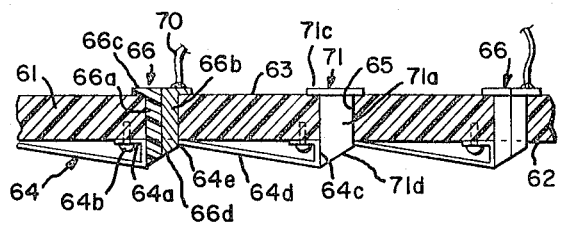
FIG. 14 is a fragmentary sectional view showing another form of program board.

FIG. 14 illustrates another embodiment of the program board, again comprising a flat body 61 of insulating material, the body presenting major surfaces 62 and 63 and being provided with a plurality of apertures 65. The apertures 65 are again arranged in groups with each group spaced circularly as hereinbefore described. In each circularly spaced group of apertures, each aperture is disposed between a different pair of conductive segments each defined by a resilient metal strip 65. Strips 64 are arcuate in the same manner as strips 54, FIG. 11, so that each group of strips 64, when properly interconnected, defines a circular conductive path extending along major surface 62 of the board.

Each strip 64 includes a generally U-shaped end portion having a short leg 64a which is secured to board 61, as by a suitable fastener 64b. The base portion of the U-shaped end of each strip 64 extends away from surface 62 at right angles and is aligned with the side wall of the corresponding aperture 65 so that when a suitable pin is inserted through the aperture 65, the pin can come into sliding engagement with portion 64c of the strip. The main body portion 64d of the strip projects as an extension of the remaining leg of the U-shaped end portion and also slants toward surface 62, the free tip 64e of the main body portion of the strip being resiliently engaged with surface 62 and aligned with the side wall of the corresponding aperture 65.

The structure just described is used in conjunction with pins 66, functioning similarly to pins 6, FIG. 4, and pins 71, functioning similarly to pins 11, FIG. 5. Pins 66 and 71 are of identical configuration and size so as to be insertable in the apertures 65, projecting beyond surface 62 for engagement with portions 64c and 64e of the metal strip 64. Pins 66 are divided longitudinally, having a non-conductive half 66a and a conductive half 66b. The two halves combine to provide a head portion 66c for engagement with surface 63, and a slanting end face 66d of such configuration that, when the head portion engages surface 63, the slanting face 66d can be positioned to extend from tip 64e of one adjacent strip 64 to the end of the base of the U of the other metal strip 64 which is most distant from surface 62, as will be clear from FIG. 14. With a pin 66 disposed as seen in FIG. 14, and with the conductor 70 connected to the conductive half 66b of the pin, the pin will be electrically connected to the strip 64 seen at the right, in FIG. 14, but will be electrically isolated from the strip 64 seen at the left.

Pins 71 are each of integral metal piece including a main body portion 71a, a head portion 71c and a slanting tip 71d.

The program board of FIG. 14 can be used with a rotary contact structure such as that seen in FIG. 7, with the resiliency of the rotary contacts 24 allowing the contacts to pass freely over the succession of strips 64 and tip faces 66d, 71d of the pins.

Figure 16:
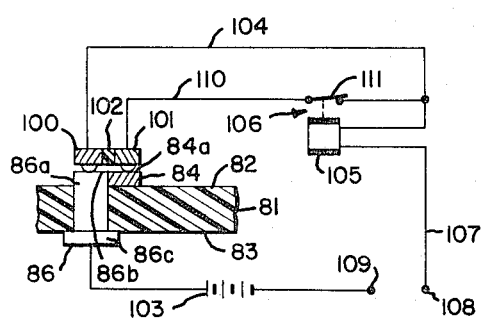
FIGS. 16 and 17 are fragmentary sectional views of the board of FIG. 15 with additional portions of the device shown diagrammatically.
Figure 15:
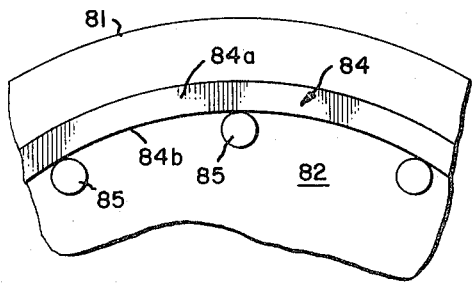
FIG. 15 is a fragmentary plan view of still another form of program board.
Figure 17:
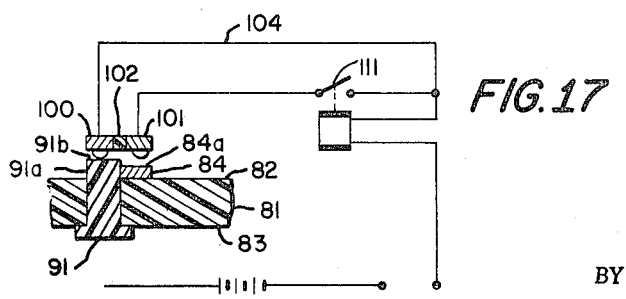

In the embodiment of the invention shown in FIGS. 15-17, the program board 81 again is a flat body of insulating material presenting major surfaces 82 and 83, a plurality of continuous circular conductive elements 84 being affixed in concentric arrangement to surface 82. Board 81 is provided with a plurality of apertures 85 arranged in circularly spaced groups, with each group of apertures 85 being spaced along one edge of one of the circular conductive elements 84 in such fashion that, at one point, the cylindrical wall of the aperture 85 and the adjacent edge of the element 84 lie in a common plane.

The board is used in conjunction with a plurality of conductive pins 86, FIG. 16, and non-conductive pins 91, FIG. 17. The conductive pins 86 are all identical, including a cylindrical main body 86a having a flat transverse end face 86b and a flanged head 86c. The dimensions of pins 86 are such that, when the pin is fully inserted in one of the apertures 85, so that the head 86c engages surfaces 83, the end face 86b of the pin will lie in the same plane as does the exposed surface 84a of ring 84. Also, because of the location of the aperture 85 relative to element 84, the body 86a of the pin is in good electrical contact with the adjacent edge 84b of the conductive element.

In this embodiment, the movable contacts to transverse the program board are arranged in groups of two contacts with one group for each of the conductive elements 84. Thus, as seen in FIG. 16, the contacts 100 and 101 are combined with an intervening body of insulation 102 so that the contacts 100, 101 are normally isolated electrically from each other. Means are provided, such as the rotary contact arm of the device illustrated in FIG. 7, for positioning contact 100 in registry with the circular series of aperture 85, and contact 101 in registry with the continuous circular strip 84 so that, when there is relative rotational movement between the program board and the contacts 100, 101, contact 100 will successively engage any of the pins inserted in apertures 85, while contact 101 will progress along face 84a of the element 84.

Each of the conductive pins 86 is connected to one terminal of an electrical power source, such as the battery 103, FIG. 16. Contact 100 is connected by conductor 104 to one terminal of the actuating winding 105 of an electromagnetic relay 106. The remaining terminal of winding 105 is connected by conductor 107 to a terminal 108. The remaining terminal of battery 103 is connected to terminal 109 so that the circuit to be controlled can be connected across the two terminals 108, 109. Contact 101 is connected via conductor 110 to a point on conductor 104 between winding 105 and contact 100. The normally open contacts 111 of relay 106 are interposed in conductor 110.

Since relay contacts 111 are normally open, winding 105 cannot be energized simply because contact 101 engages element 84 and this element is in turn in contact with at least one pin 86 connected to the battery 103. However, when contact 100 moves into engagement with the end face 86b of a pin 86 which is connected to battery 103, winding 105 is energized by current flow via conductor 104 and, contacts 111 thus being actuated to their closed position, the relay winding will remain energized via contact 101 and conductor 110 despite the fact that contact 100 is moved away from the conductive pin 86 so that current is no longer supplied via this contact.

The non-conductive pins 91 of this embodiment are similar in configuration to contacts 86 but the body portion 91a thereof is significantly longer, so that the end face 91b of the pin is spaced further from surface 82, when the pin is fully inserted, as seen in FIG. 17, than is the surface 84a of conductive element 84. Accordingly, whenever the relative rotational movement between the program board and the contacts 100, 101 is such that these contacts are brought to the position of one of the non-conductive pins 91, engagement of contacts 100 with end face 91b of the non-conductive pin will shift the contact structure away from board 81, so that contact 101 is no longer engaged with conductive element 84. Current flow to the winding 105 of relay 106 is accordingly interrupted, and the relay will not again be energized until contact 100 again engages one of the conductive pins 86 at a time when contact 101 is in engagement with element 84, as seen in FIG. 16.

Though particularly advantageous embodiments of the invention have been chosen for illustrative purposes, it will be understood that various changes and modifications can be made therein without departing from the scope of the invention as defined in the appended claims.

What is claimed is:

1. In a programmable electrical control device, the combination of
   a program board presenting a major surface;
   a plurality of electrically conductive means secured to said board and each occupying a different exposed position,
      each of said conductive means defining a predetermined path over said major surface,
      said conductive means being electrically insulated from each other,
      said board being provided with a plurality of groups of apertures with each of said groups of apertures being spaced along a different one of said conductive means;
   means for connecting a source of electrical power to said conductive means comprising a plurality of connector units each including a pin insertable in one of said apertures,
      said connector units and said conductive means coacting, when said pins are selectively inserted in said apertures, to operatively connect the source of power to portions of said conductive means with said portions being predetermined by the selective insertion of said pins in said apertures;
   a plurality of contacts to be connected to electrical means to be controlled;
   means supporting said contacts in predetermined positions relative to said board such that selected ones of said contacts occupy positions on the predetermined paths by corresponding ones of said conductive means; and
   drive means operatively connected to provide relative movement between said contacts and said board to cause said contacts to traverse the respective paths defined by said conductive means.

2. A device according to claim 1 wherein
   each of said conductive means comprises a plurality of arcuate conductive segments arranged in a circular series, each of said apertures being disposed between the adjacent ends of a different proximate pair of said segments,
   at least some of said pins including conductive portions operative to interconnect said adjacent ends of the respective ones of said segments when the pin is inserted in one of said apertures,
   the plurality of circular series of segments of said plurality of conductive means being concentric and said relative movement being rotary movement about the common axis of said concentric series.

3. A device according to claim 2 wherein
   some of said pins include portions disposed between said adjacent ends of respective ones of said segments when the pin is inserted in one of said apertures,
      said portions including an electrically conductive part, adapted to contact one of said adjacent ends, and an electrically non-conductive part operative to insulate the pin from the other of said adjacent ends, and
   the ones of said connector units including said last-mentioned pins being provided with conductors connected to said electrically conductive parts of said pins.

4. A device according to claim 1 wherein
   each of said conductive means comprises a plurality of conductive segments arranged end to end in a spaced series, each of said apertures being disposed between the adjacent ends of a different proximate pair of said segments,
   some of said pins include portions disposed between said adjacent ends of respective ones of said segments when the pin is inserted in one of said apertures, said portions comprising an electrically conductive part adapted to contact one of said adjacent ends, and an electrically non-conductive part operative to insulate the pin from the other of said adjacent ends, and the ones of said conductor units including said last-mentioned pins being provided with conductors connected to said conductive parts of said pins.

5. A device according to claim 1, wherein
each of said conductive means comprises a plurality of resilient conductive segments arranged in a series with the adjacent end portions of each adjacent pair of said segments overlapping each other in such fashion that one of the overlapping end portions is undistorted and lies adjacent said major surface and the other of the overlapping end portions is deflected from said major surface by presence of said one end portion,
   said overlapping end portions of said segments normally being in electrical contact with each other; and
said apertures each opening through said board at a location immediately adjacent the tip of the undistorted one of a pair of said overlapping end portions and is directed toward the deflected one of said pair of end portions;
at least some of said pins being non-conductive and insertion of a non-conductive one of said pins in one of said apertures serving to further deflect the deflected one of the corresponding pair of said end portions to disconnect such pair of end portions from each other electrically.

6. A device according to claim 5, wherein
each of said apertures opens toward the tip of the undistorted one of the corresponding pair of said end portions; and
at least one of said pins is conductive and includes
   a body portion of larger transverse cross-section,
   a tip portion of smaller transverse cross-section, and
   a transverse shoulder at the junction of said body and tip portions,
insertion of said at least one pin into one of said apertures causing said tip portion of said pin to engage and deflect the deflected one of the corresponding pair of said end portions and said shoulder to engage said tip of the undistorted one of said pair of end portions.

7. A device according to claim 1, wherein
each of said conductive means comprises a plurality of conductive metal strips each having a generally U-shaped end portion and a body portion projecting as an extension of one of the legs of the U of said end portion,
   the other leg of the U of said end portion being fixed to said board,
   said body portion slanting toward said major surface of said board and terminating in a tip located at said major surface;
said strips being arranged in a series end-to-end with said tip of said body portion of one strip propecting toward and spaced from the base of the U of said end portion of the next strip in the series;
said apertures each being located in the space between said tip of said body portion of one strip and the base of the U of said end portion of the next strip;
each of said pins, when operatively inserted in one of said apertures, projecting into bridging engagement between said tip of said body portion of one of said strips and the base of the U of said end portion of the next strip in the series.

8. A device according to claim 7, wherein
at least some of said pins each comprise a conductive portion and a non-conductive portion,
   said conductive and non-conductive portions presenting laterally opposed conductive and non-conductive faces for engagement respectively with different ones of said strips, whereby such pin, when operatively inserted in one of said apertures, will be connected electrically to only one of the two adjacent strips.

9. A device according to claim 7, wherein
said apertures each are of a predetermined depth;
said pins are each longer than the depth of said apertures; and
each of said pins includes a slanting tip face which extends as a bridging surface between said tip of said body portion of one of said strips and the juncture between the base of the U and said one leg of the U of said end portion of the next of said strips in the series when the pin is fully inserted in one of said apertures.

10. A device according to claim 1, wherein
each of said conductive means is a strip of conductive material having an elongated edge;
said apertures of each of said groups are located at points spaced along and adjacent to said elongated edge of the corresponding one of said strips,
   at least some of said pins being conductive and the conductive pins electrically contacting said strip when operatively inserted in said apertures;
said contacts are arranged in pairs with the contacts of each pair electrically insulated from each other,
   one contact of each pair engaging one of said strips,
   the other contact of each pair being positioned to successively engage said pins when said pins are inserted in selected ones of the group of said apertures associated with said one strip,
the device further comprising
a plurality of electrical relay means each providing a control current path and a controlled current path,
   the controlled current path of each of said relay means being connected to said one contact of a different one of said pairs of contacts, and
   the control current path of each of said relay means being connected to said other contact of said one pair of contacts.

11. An electrically operated wheeled toy embodying the control device of claim 1 and further comprising
two electrical motors each arranged to drive a different wheel of the toy;
an electrical signal;
a battery holder adapted to retain a plurality of batteries and including a plurality of supply terminals;
electrical conductors connecting electrically conductive ones of said pins to said supply terminals;
an additional electric motor,
   said means supporting said contacts comprising a rotatable structure driven by said additional motor and equipped with slip ring means; and
circuit means connecting said contacts via said slip ring means to said two electrical motors and said signal.

References Cited

UNITED STATES PATENTS

| | | | |
|---|---|---|---|
| 1,231,762 | 7/1917 | Long | 200—46 |
| 3,131,508 | 5/1964 | Brown | 46—244 |
| 3,252,247 | 5/1966 | Miller et al. | 46—244 |

BERNARD A. GILHEANY, *Primary Examiner.*

R. N. ENVALL, JR., *Assistant Examiner.*